(12) United States Patent  
Kurtz

(10) Patent No.: US 9,063,027 B2  
(45) Date of Patent: Jun. 23, 2015

(54) GAGE PRESSURE TRANSDUCER AND METHOD FOR MAKING THE SAME

(71) Applicant: Nora Kurtz, Saddle River, NJ (US)

(72) Inventor: Anthony D. Kurtz, Saddle River, NJ (US)

(73) Assignee: KULITE SEMICONDUCTOR PRODUCTS, INC., Leonia, NJ (US)

(*) Notice: Subject to any disclaimer, the term of this patent is extended or adjusted under 35 U.S.C. 154(b) by 88 days.

(21) Appl. No.: 14/069,606

(22) Filed: Nov. 1, 2013

(65) Prior Publication Data

US 2014/0053652 A1    Feb. 27, 2014

Related U.S. Application Data

(63) Continuation of application No. 13/486,416, filed on Jun. 1, 2012, now Pat. No. 8,607,637, which is a continuation of application No. 12/971,615, filed on Dec. 17, 2010, now Pat. No. 8,191,425.

(51) Int. Cl.

| | |
|---|---|
| *G01L 9/06* | (2006.01) |
| *G01L 13/02* | (2006.01) |
| *G01L 13/00* | (2006.01) |
| *G01L 15/00* | (2006.01) |
| *G01L 19/06* | (2006.01) |

(52) U.S. Cl.  
CPC ......... *G01L 13/025* (2013.01); *Y10T 29/49826* (2015.01); *Y10T 29/49007* (2015.01); *G01L 13/00* (2013.01); *G01L 15/00* (2013.01); *G01L 19/0627* (2013.01); *G01L 9/06* (2013.01)

(58) Field of Classification Search  
None  
See application file for complete search history.

(56) References Cited

U.S. PATENT DOCUMENTS

| | | | | |
|---|---|---|---|---|
| 6,782,754 | B1* | 8/2004 | Broden et al. | 73/753 |
| 7,275,444 | B1* | 10/2007 | Kurtz et al. | 73/716 |
| 7,432,795 | B2* | 10/2008 | Kurtz et al. | 338/36 |
| 7,540,196 | B2* | 6/2009 | Kurtz et al. | 73/714 |
| 7,673,518 | B2* | 3/2010 | Kurtz | 73/716 |
| 7,921,721 | B2* | 4/2011 | Kurtz | 73/714 |
| 2009/0108382 | A1* | 4/2009 | Eriksen et al. | 257/419 |
| 2012/0118069 | A1* | 5/2012 | Kane | 73/756 |

* cited by examiner

*Primary Examiner* — Andre Allen  
(74) *Attorney, Agent, or Firm* — Troutman Sanders LLP; James E. Schutz; Mark Lehi Jones

(57) ABSTRACT

A method, device and system for a gage pressure transducer including the making thereof are provided. In one embodiment, a method comprises receiving, at a first diaphragm, a first pressure, wherein the first diaphragm is composed of metal; transferring, from the first diaphragm, to a first sensor, the first pressure using a first oil region, wherein the first oil region is disposed between the first diaphragm and the first sensor; receiving, at the first sensor, the first pressure; measuring, by the first sensor, the first pressure to generate a first pressure signal; and outputting, from the first sensor, to a first header pin, the first pressure signal, wherein the first header pin is electrically coupled to the first sensor using a first conductive glass frit.

20 Claims, 5 Drawing Sheets

GAGE PRESSURE TRANSDUCER AND METHOD FOR MAKING THE SAME

CROSS-REFERENCE TO RELATED APPLICATION

This application claims priority under 35 U.S.C. §120 to U.S. patent application Ser. No. 13/486,416, filed Jun. 1, 2012, which is a continuation application claiming priority to U.S. patent application Ser. No. 12/971,615, filed Dec. 17, 2010, now U.S. Pat. No. 8,191,425, issued Jun. 5, 2012, all of which are entitled "GAGE PRESSURE TRANSDUCER AND METHOD FOR MAKING THE SAME," and all of which are incorporated by reference in their entirety as if fully set forth below.

TECHNICAL FIELD

The present invention relates to gage pressure transducers, and more particularly to a gage pressure transducer comprising a plurality of pressure sensing assemblies in a single housing.

BACKGROUND

Gage pressure transducers are often used to measure gage/differential pressures in harsh environments. Generally, gage pressure transducers comprise two pressure sensing assemblies, with one pressure sensing assembly being exposed to a main pressure and the other being exposed to a reference pressure. Each pressure sensing assembly includes a half-bridge sensor such that when they combine together, they provide a gage pressure measurement of the environment to be measured.

Many of the gage pressure transducer assemblies of the prior art, however, present shortcomings that interfere with the accuracy of the gage pressure measurement. For example, some embodiments utilize non-oil filled pressure capsules contained in a non-hermetic gage transducer assembly. The non-hermeticity of this gage transducer assembly enables the harsh environment to interfere with the operation of the transducer assembly, which consequently may adversely affect the accuracy of the overall gage pressure measurement. In another example, other embodiments utilize wire-bonded oil filled pressure capsules, which require large volumes of oil to operate. Large volumes of oil, however, cause significant back pressure against the deflecting diaphragm, which also interferes with the accuracy of the overall gage pressure measurement.

Accordingly, there is a need for a gage pressure transducer assembly that utilizes hermetically sealed pressure sensing assemblies such that harsh environments do not interfere with the operation and, further, an assembly that utilizes minimal oil, such that back pressures associated with large oil volumes can be reduced.

BRIEF SUMMARY OF THE INVENTION

Embodiments of the present invention provide a miniaturized, hermetically sealed gage transducer assembly, and a method for making the same, comprising: a housing having a first section and a second section, a first sensing assembly housed in the first section, the first sensing assembly being exposed to a main pressure, and a second sensing assembly housed in the second section, the second sensing assembly being exposed to a reference pressure, and an oil region that is less than approximately 0.015 inches. The first sensing assembly and the second sensing assembly may be leadless. Further, the first and second sensing assemblies may be substantially identical in configuration and in electrical communication with each other.

More specifically, the first and second sensing assemblies may each comprise a half-bridge piezoresistive sensing network that electrically communicate with each other to form a complete Wheatstone Bridge.

Even more specifically, the sensing assemblies may comprise: a header shell; a glass pre-form configured to fit within the header shell, the glass pre-form comprising a plurality of pin apertures and an oil tube aperture; a plurality of header pins, each extending through one of the plurality of pin apertures past a top surface of the glass pre-form; an oil tube extending through the oil tube aperture past the top surface of the glass pre-form; a sensor mounted onto a top surface of the glass pre-form, wherein the sensor comprises electrical contact pads that are aligned and in electrical communication with the header pins; a diaphragm mounted on a top surface of the header shell such that it is above the sensor; wherein the oil region is disposed between the diaphragm and the sensor, wherein the oil tube provides oil to the oil region. The sensing assemblies may further comprise an alignment glass plate mounted onto the top surface of the glass pre-form, comprising a first aperture for encircling the oil tube and a second aperture for encircling the sensor.

To hermetically seal the device, glass frits may be used to secure the bonding between the header pins and the electrical contact pads, the sensor and the glass pre-form, and the alignment glass plate and the glass pre-form.

Further, the header shell can comprise an outwardly extending flange adapted to secure and hermetically seal the first and second sensing assemblies into the first and second sections, respectively.

The resultant device is a miniaturized, hermetically sealed gage pressure transducer comprising sensing assemblies that, in combination, accurately measure gage pressure in harsh environments without interference from back pressures caused by large oil volumes.

DETAILED DESCRIPTION

Figure 1:
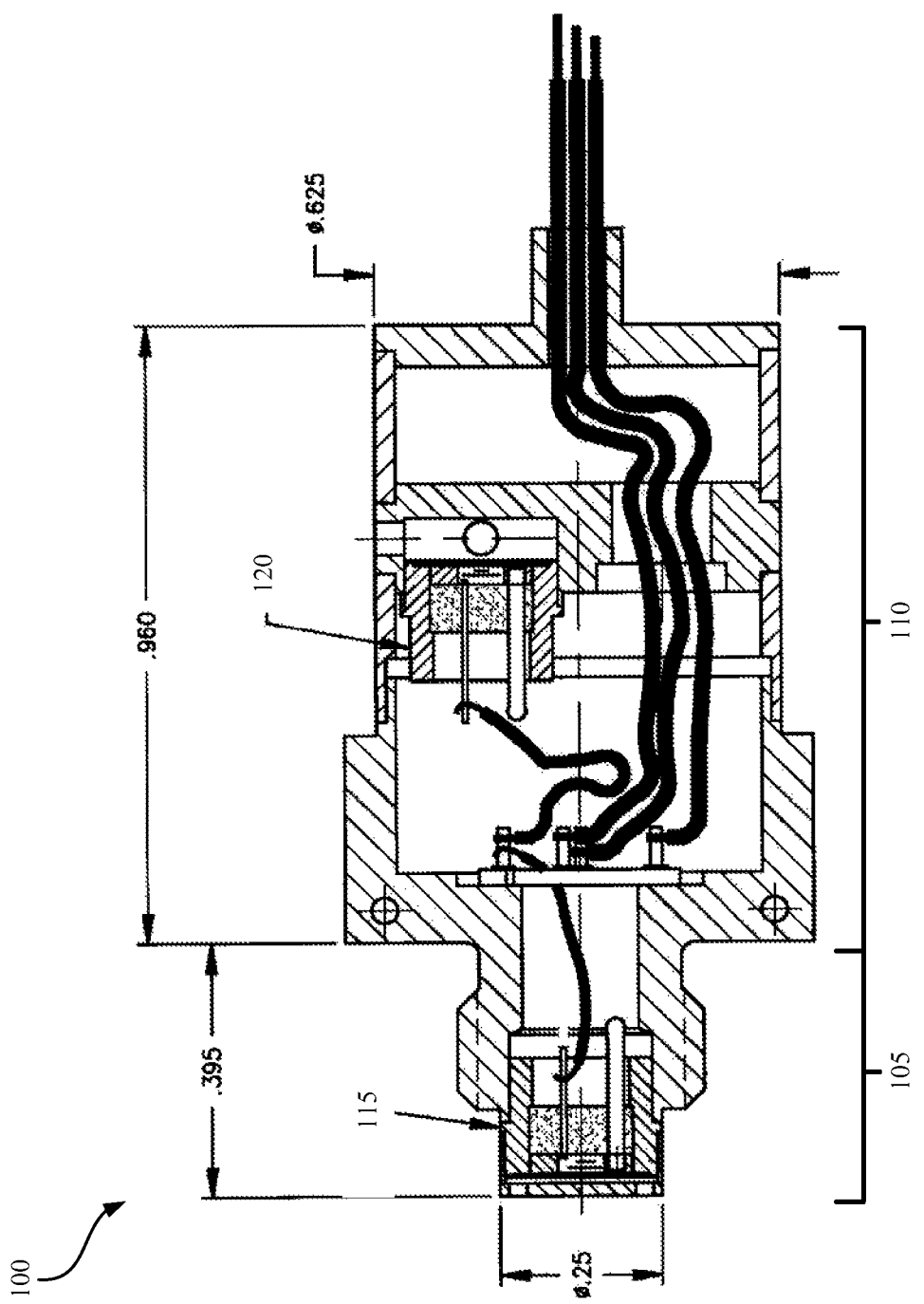
FIG. 1 illustrates a gage pressure transducer assembly comprising two pressure sensing assemblies according to an aspect of the present invention.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical gage pressure transducers and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Referring to FIG. 1, there is shown a gage pressure transducer assembly 100 having a first section 105 and a second section 110. A first pressure sensing assembly 115 is housed in the first section 105 and a second pressure sensing assembly 120 is housed in the second section 110. The first pressure sensing assembly 115 and the second pressure sensing assembly 120 may be fit within their respective pressure ports, which are defined within the gage pressure transducer assembly 100. The first 115 and second 120 pressure sensing assemblies are welded within the pressure ports such that they are hermetically sealed within the pressure ports. The hermetic sealing enables the gage pressure transducer assembly 100 to accurately measure pressures in harsh environment applications without interference from the environment.

In various embodiments of the present invention, the gage pressure transducer assembly 100 is miniaturized. This miniaturization is achieved by utilizing pressure sensing assemblies 115/120, which may be leadless and are described further herein. In one example, the length of the first section 105 is approximately 0.395 inches and the width is approximately 0.25 inches. In another example, the length of the second section 110 is approximately 0.960 inches and the width is approximately 0.625 inches. The embodiments of the present invention, however, are not limited to these dimensions and can be of many dimensions.

Figure 2:
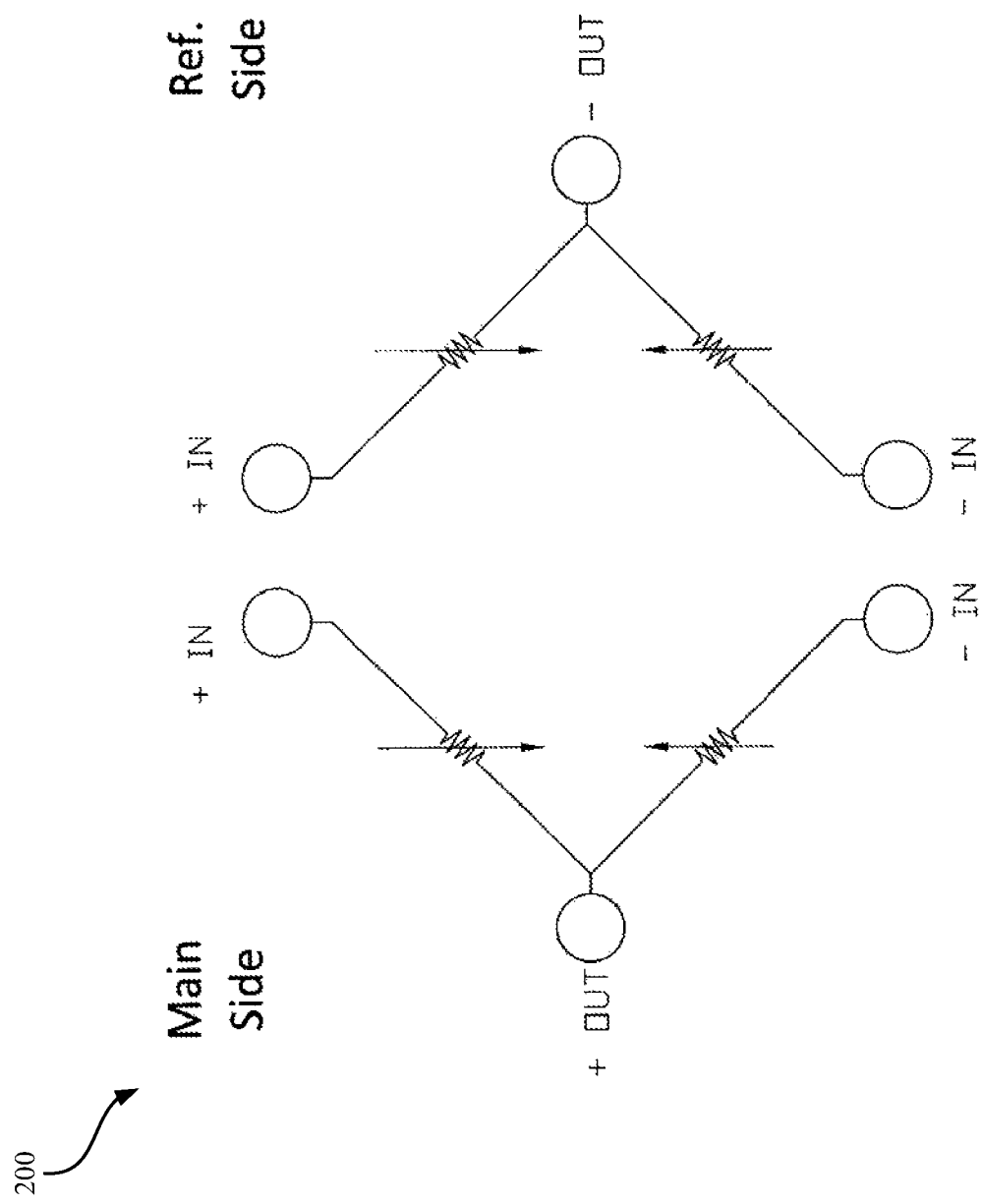
FIG. 2 illustrates a combined Wheatstone Bridge according to an aspect of the present invention.

The first pressure sensing assembly 115 of the present invention may be exposed to a main (external) pressure, while the second pressure sensing assembly 120 may be exposed to a reference (absolute) pressure. Both the first pressure sensing assembly 115 and the second pressure sensing assembly 120 comprise a half-bridge piezoresistive sensing network and electrically communicate with each other to form a complete Wheatstone bridge, as illustrated in FIG. 2. The Wheatstone Bridge subtracts the reference pressure from the main pressure, which therefore provides an accurate gage pressure measurement.

Figure 3:
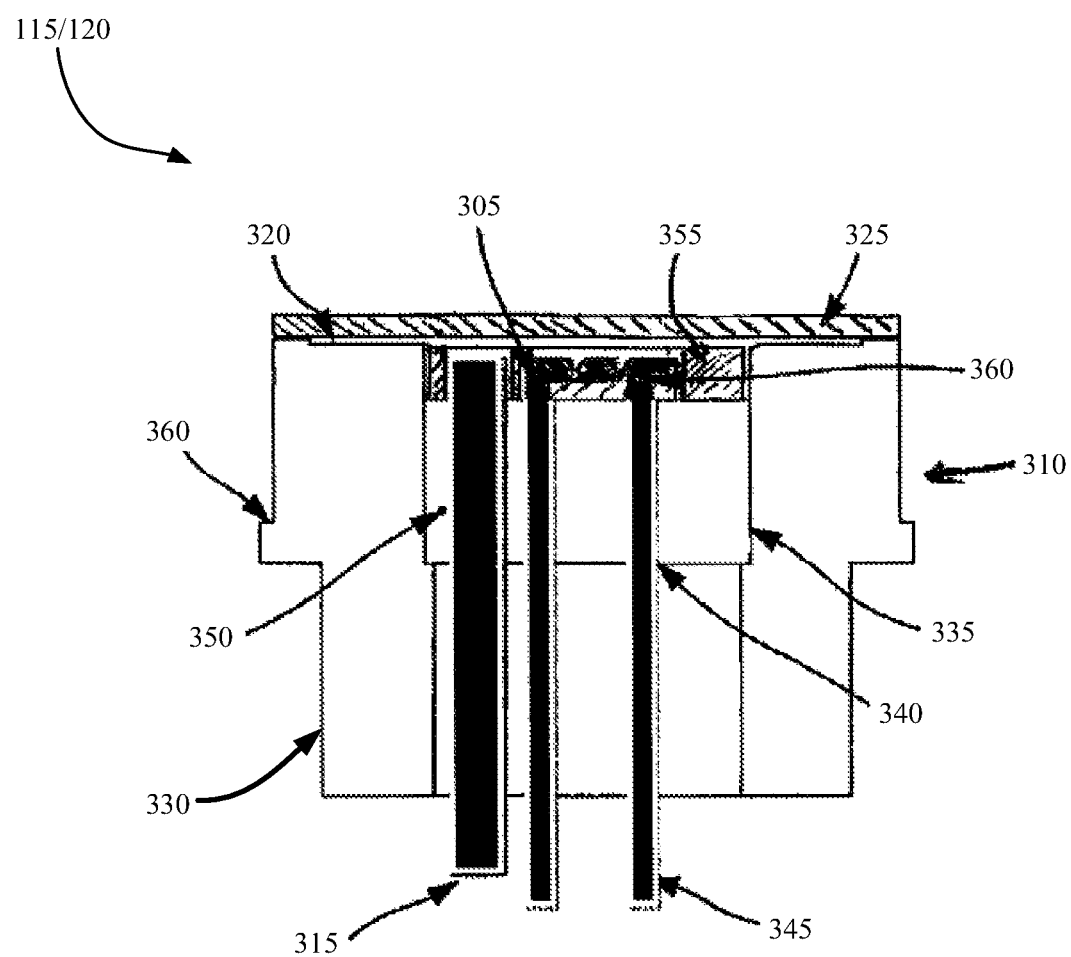
FIG. 3 provides a cross-sectional illustration of a leadless pressure sensing assembly according to an aspect of the present invention.

Referring to FIG. 3, there is shown an embodiment of the first 115 and second 120 pressure sensing assemblies, which are substantially identical in configuration. The first 115 and second 120 pressure sensing assemblies generally comprise a leadless sensor 305, a leadless header assembly 310, and a metal diaphragm 325. More specifically, the metal diaphragm 325 is secured to the header assembly 310 and covers the top portion of the leadless sensor 305, which is also secured to the header assembly. Further, the first 115 and second 120 pressure sensing assemblies comprise an oil region 320 disposed between the metal diaphragm 325 and the sensor 305. This general configuration of the first 115 and second 120 pressure sensing assemblies utilizes less oil in comparison to designs in the prior art. Less oil utilization reduces back pressures caused by large amounts of oil, and therefore optimizes the overall transducer performance and enables its size to be miniaturized.

The header assembly 310 comprises a header shell 330, a glass pre-form 335, header pins 345, and an oil tube 315. The exterior of the header shell 330 has an outwardly extending flange 360, which enables the welding of the header assembly 310 into the respective pressure ports defined within the gage pressure transducer assembly 100. This configuration further facilitates complete hermetic sealing of the gage pressure transducer assembly 100, which enables superior pressure transmission to the sensors 305 of the first 115 and second 120 pressure sensing assemblies.

The glass pre-form 335 is configured to fit within the header shell 330. In various embodiments, the glass pre-form 335 comprises a plurality of pin apertures 340 and an oil tube aperture 350. The pin apertures 340 are configured to receive header pins 345 are adapted to electrically communicate with the sensor 305. In some embodiments, the header pins 345 may have a diameter of approximately 0.01 inches and may extend approximately 0.005 inches from the top surface of the glass pre-form 335 to make contact with contact terminals located on the sensor 305. The header pins 345 are not limited to these dimensions, however.

The oil tube aperture 350 is configured to receive the oil tube 315, which provides oil to the oil region 320 located between the metal diaphragm 325 and the sensor 305. In some embodiments, the oil tube 315 is approximately 0.03 inches in diameter, however other embodiments may comprise oil tubes of different dimensions.

Figure 4:
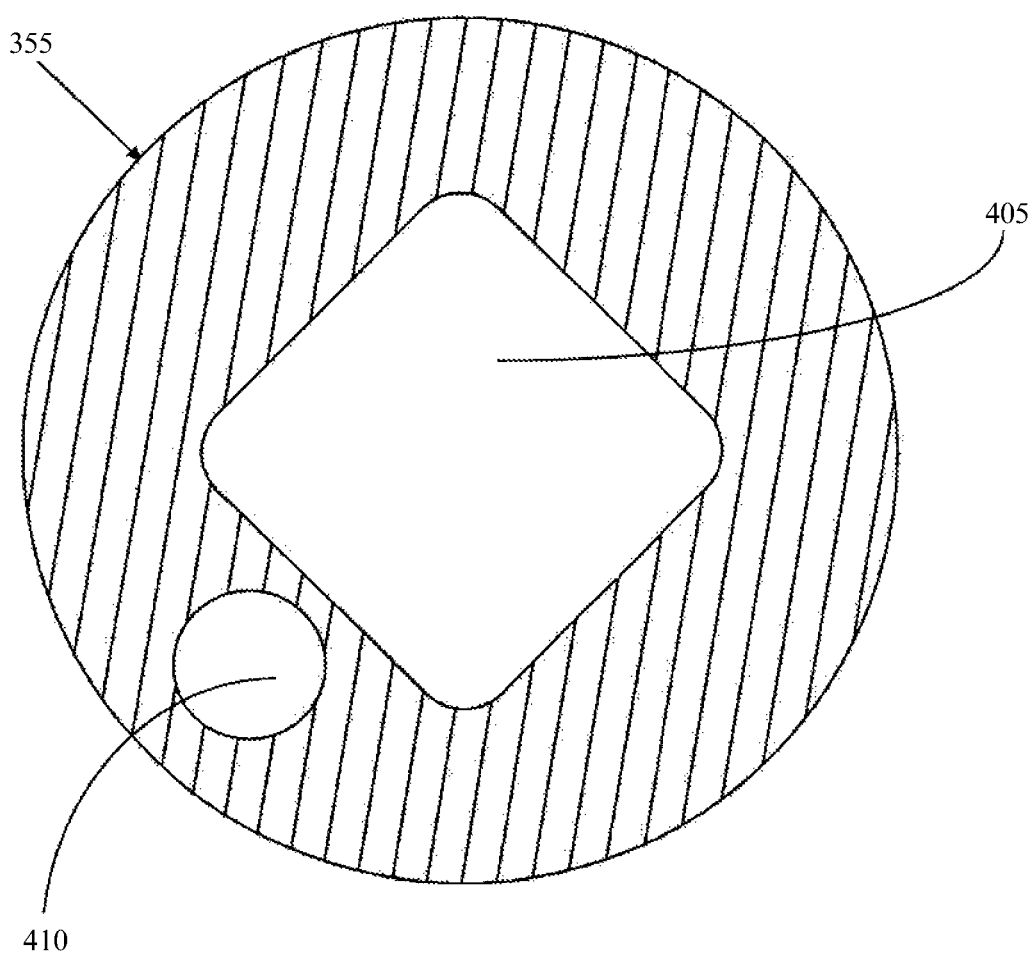
FIG. 4 provides a top view illustration of an alignment glass plate according to an aspect of the present invention.

Referring to FIG. 4, there is shown an alignment glass plate 355. This alignment glass plate 355 helps to align the sensor 305 of the first 115 and second 120 pressure sensing assemblies. The alignment glass plate 355 defines a centralized first aperture 405 and a second aperture 410. The first aperture 405 is substantially square-shaped in cross section and configured to accommodate the sensor 305, such that it covers the sides of the sensor 305. It should be understood that because the first aperture 405 cooperatingly accommodates the sensor 305, it therefore takes on the approximate shape and dimensions of the sensor 305. The second aperture 410 is configured to encircle the oil tube 315. Accordingly, the second aperture 410 is substantially circular-shaped in cross section and takes on the approximate shape and dimensions of the oil tube 315.

Figure 5:
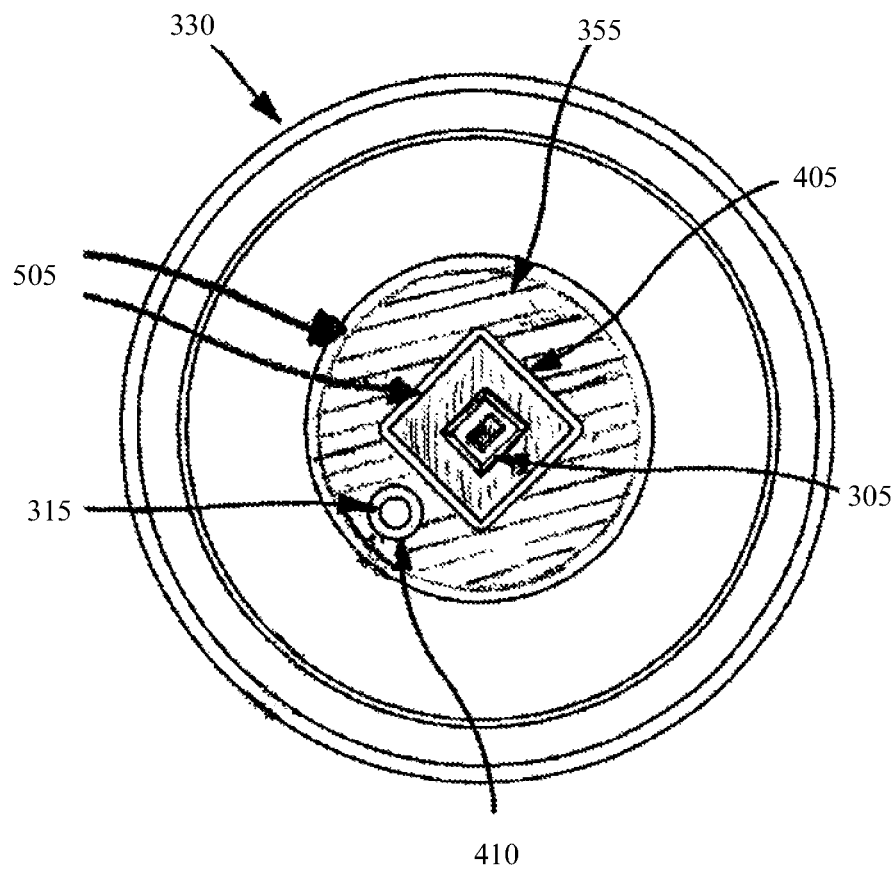
FIG. 5 provides a cross-sectional illustration of the pressure sensing assembly according to an aspect of the present invention.

As illustrated in FIG. 3, the alignment glass plate 355 may have a diameter substantially equal to the diameter of the glass pre-form 335, such that the alignment glass plate 355 may be aligned and mounted to the glass pre-form 335. To secure the attachment of the alignment glass plate 355 to the glass pre-form 335, a non-conductive glass frit may be used to enhance the bonding, which fills into small spaces between the alignment glass plate 355 and the glass pre-form 335. FIG. 5 illustrates the alignment glass plate 355 mounted onto the glass pre-form 335, wherein glass frit 505 is used to enhance the bonding.

The bottom of the sensor 305 may also be mounted onto the glass pre-form 335. A non-conductive glass frit may be used to enhance the bonding between the bottom of the sensor 305 and the glass pre-form 335. A conductive glass frit may be used to bond the header pins 345 to the contact terminals on the sensor 305, such to enable electrical communication between the header pins 345 and the sensor 305. The non-conductive glass frit enhances bonding by filling in voids between the sensor 305 and the glass pre-form 335, and the conductive glass frit enhanced bonding between the header pins 345 and the contact terminals on the sensor 305.

Referring back to FIG. 3, the metal diaphragm 325 may be mounted onto the header shell 330 such that it is positioned above the sensor 305 and the alignment glass plate 355. Disposed between the metal diaphragm 325 and the sensor 305 and the alignment glass plate 355 is an oil region 320, wherein oil from the oil tube 315 may be deposited.

Many of the embodiments of the prior art do not comprise gold bonds or gold wires, therefore enabling the size of the oil region 320 to be drastically reduced in comparison to oil regions of the prior art. The oil region 320 of the present invention, for example, may be less than approximately 0.015 inches, and more specifically may be between 0.001 to 0.002 inches in thickness. Such reduced dimensions reduce the amount of oil required for the first and second pressure sensing assemblies 115/120 by at least an order of magnitude in comparison to the non-leadless oil filled sensors of the prior art.

The reduced oil volume correspondingly reduces the back pressure associated with the oil, which may be calculated using the equation below:

$$P = \frac{16VEt^3}{\pi(1-v^2)a^6},$$

where V is the expanded volume of the oil, t is the thickness of the diaphragm, E is Young's modulus of the diaphragm, v is Poisson's ratio, and a is the radius of the diaphragm. The reduced back pressure enables the gage pressure transducer 100 to accurately measure gage pressures at very low pressures, for example, below 5 psi.

The resultant device is a miniaturized, hermetically sealed gage pressure transducer comprising pressure sensing assemblies that, in combination, accurately measure gage pressure in harsh environments without interference from back pressures caused by large oil volumes.

What is claimed is:

1. A method, comprising:
   receiving, at a first diaphragm, a first pressure, wherein the first diaphragm is composed of metal;
   transferring, from the first diaphragm, to a first sensor, the first pressure using a first oil region, wherein the first oil region is disposed between the first diaphragm and the first sensor;
   receiving, at the first sensor, the first pressure;
   measuring, by the first sensor, the first pressure to generate a first pressure signal; and
   outputting, from the first sensor, to a first header pin, the first pressure signal, wherein the first header pin is electrically coupled to the first sensor using a first conductive glass frit.
2. The method of claim 1, wherein the first oil region is less than 0.015 inches in thickness.
3. The method of claim 1, wherein the first oil region is capable of transferring the first pressure for an accurate measurement by the first sensor of less than five pounds per square inch (5 psi).
4. The method of claim 1, wherein the first sensor is a first half-bridge piezoresistive sensing network.
5. The method of claim 1, wherein the first sensor, the first diaphragm, the first oil region, the first header pin and the first conductive glass frit are associated with a first sensing assembly.
6. The method of claim 5, wherein the first sensing assembly is hermetically sealed.
7. The method of claim 5, wherein the first sensing assembly is miniaturized.
8. The method of claim 1, further comprising:
   receiving, at a second diaphragm, a second pressure;
   transferring, from the second diaphragm, to a second sensor, the second pressure using a second oil region, wherein the second oil region is disposed between the second diaphragm and the second sensor;
   receiving, at the second sensor, the second pressure;
   measuring, by the second sensor, the second pressure to generate a second pressure signal; and
   outputting, from the second sensor, to a second header pin, the second pressure signal, wherein the second header pin is electrically coupled to the second sensor using a second conductive glass frit.
9. The method of claim 8, wherein the first pressure signal and the second pressure signal are used to determine a differential pressure signal.
10. The method of claim 8, wherein the first sensor is a first half-bridge piezoresistive sensing network and the second sensor is a second half-bridge piezoresistive sensing network.
11. A system, comprising:
    a first conductive glass frit;
    a first header pin;
    a first diaphragm composed of metal and adapted to receive a first pressure;
    a first sensor electrically coupled to the first header pin using the first conductive glass frit, wherein the first sensor is configured to:
    receive the first pressure;
    measure the first pressure to generate a first pressure signal; and
    output, to the first header pin, the first pressure signal; and
    a first oil region disposed between the first diaphragm and the first sensor and adapted to transfer, from the first diaphragm, to the first sensor, the first pressure.
12. The system of claim 11, wherein the first oil region is less than 0.015 inches in thickness.
13. The system of claim 11, wherein the first oil region is capable of transferring the first pressure for an accurate measurement by the first sensor of less than five pounds per square inch (5 psi).
14. The system of claim 11, wherein the first sensor is a first half-bridge piezoresistive sensing network.
15. The system of claim 11, wherein the first sensor, the first diaphragm, the first oil region, the first header pin and the first conductive glass frit are associated with a first sensing assembly.
16. The system of claim 15, wherein the first sensing assembly is hermetically sealed.
17. The system of claim 11, further comprising:
    a second conductive glass frit;
    a second header pin;
    a second diaphragm composed of metal and adapted to receive a second pressure;
    a second sensor electrically coupled to the second header pin using the second conductive glass frit, wherein the second sensor is configured to:
    receive the second pressure;
    measure the second pressure to generate a second pressure signal; and
    output, to the second header pin, the second pressure signal; and
    a second oil region disposed between the second diaphragm and the second sensor and adapted to transfer, from the second diaphragm, to the second sensor, the second pressure.
18. The system of claim 17, wherein the first pressure signal and the second pressure signal are used to determine a differential pressure signal.
19. The system of claim 17, wherein the first sensor is a first half-bridge piezoresistive sensing network and the second sensor is a second half-bridge piezoresistive sensing network.
20. The system of claim 17, wherein the first sensor, the first diaphragm, the first oil region, the first header pin and the first conductive glass frit are associated with a first sensing assembly;

wherein the second sensor, the second diaphragm, the second oil region, the second header pin and the second conductive glass frit are associated with a second sensing assembly; and wherein the first sensing assembly is housed in a first section of a housing and the second sensing assembly is housed in a second section of the housing.

* * * * *